United States Patent
Prachar

[11] 3,881,351
[45] May 6, 1975

[54] METHOD OF MEASURING THE MASS FLOW RATE OF A CONSTITUENT OF A GASEOUS STREAM

[75] Inventor: Otakar P. Prachar, Troy, Mich.

[73] Assignee: General Motors Corporation, Detroit, Mich.

[22] Filed: June 29, 1972

[21] Appl. No.: 267,589

[52] U.S. Cl. .............................................. 73/194 M
[51] Int. Cl. .......................................... G01f 1/00
[58] Field of Search ......... 73/19, 23, 194 R, 194 M, 73/231 M, 196, 198; 250/302

[56] References Cited
UNITED STATES PATENTS

| | | | |
|---|---|---|---|
| 3,033,036 | 5/1962 | Leisey | 73/194 |
| 3,435,660 | 4/1969 | Sternberg | 73/194 |
| 3,435,678 | 4/1969 | Sternberg | 73/194 |
| 3,438,241 | 4/1969 | McKinley, Jr. | 73/19 |
| 3,566,685 | 3/1971 | Zimmerman et al. | 73/194 |
| 3,643,507 | 2/1922 | Garrett | 73/194 |
| 3,727,048 | 4/1973 | Haas | 250/302 |

Primary Examiner—Herbert Goldstein
Attorney, Agent, or Firm—Warren D. Hill

[57] ABSTRACT

To measure the mass flow rate of a constituent of a gaseous stream, for example, a pollutant in an engine exhaust gas, the concentration or mole fraction of the constituent is measured by an analyzer. Then a tracer gas is injected into the gaseous stream at a predetermined rate and mixed therewith and the concentration of the tracer gas is measured. Then the mass flow rate of the constituent is calculated by the equation $\dot{W}_c = C_c M_c \dot{W}_t / C_t M_t$ where $\dot{W}_c$ and $\dot{W}_t$ are the mass flow rates of the constituent and the tracer gas respectively, $C_c$ and $C_t$ are the concentrations of the constituents and the tracer gas respectively, and $M_c$ and $M_t$ are the molecular weights of the constituent and the tracer gas respectively. Several constituents may be monitored simultaneously in this manner by measuring the concentration of each constituent and using only the one measurement for the tracer gas.

1 Claim, 1 Drawing Figure

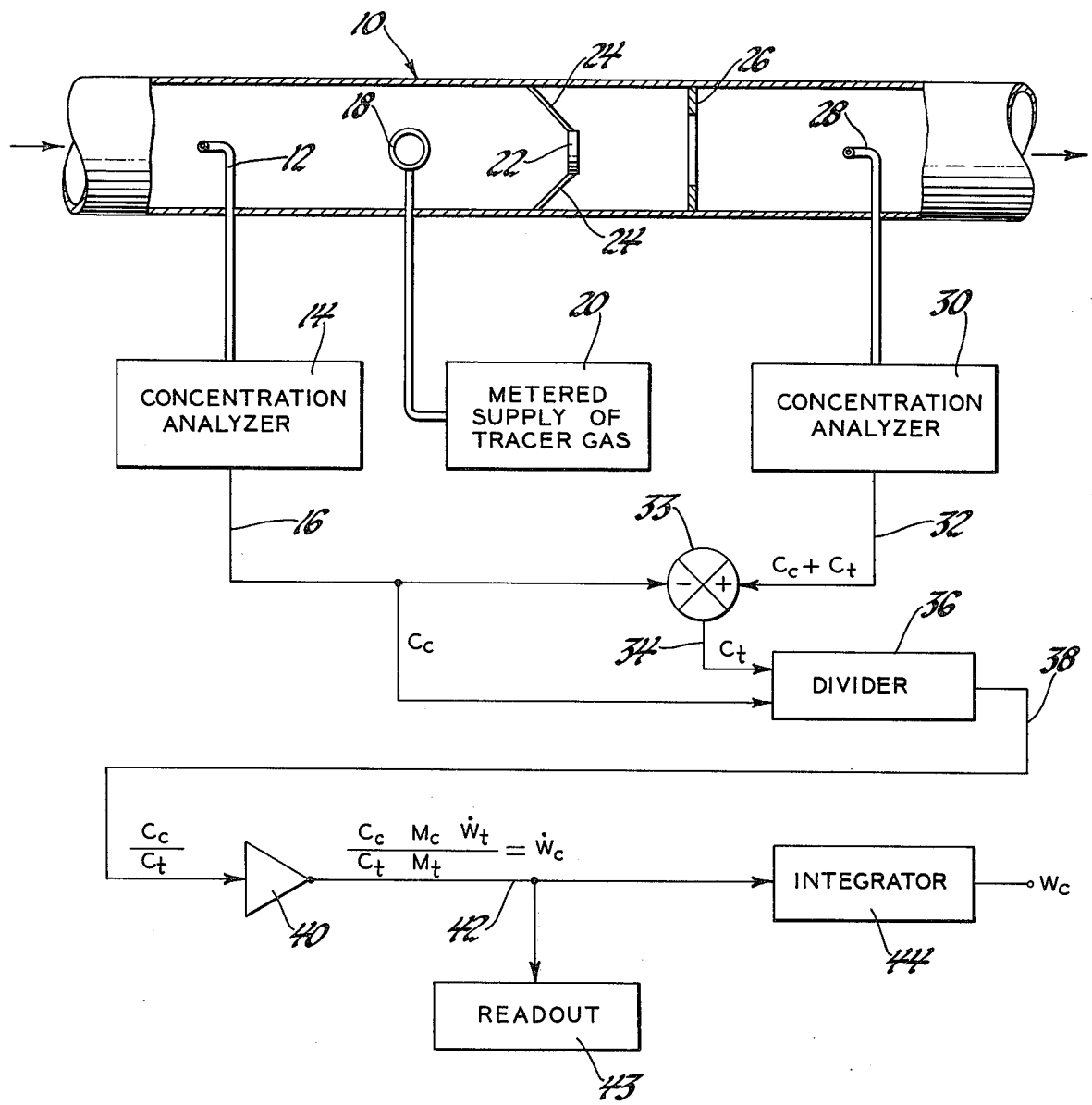

METHOD OF MEASURING THE MASS FLOW RATE OF A CONSTITUENT OF A GASEOUS STREAM

This invention relates to a tracer gas method for measuring the mass flow rate of a constituent of a gas stream.

It is often desirable to measure the mass flow rate of a constituent in a gas stream; for example, to determine the amount of a pollutant in the exhaust gases of an internal combustion engine. usually these constituents are of very low concentration compared to the total exhaust flow. Since the total exhaust flow can vary greatly and is substantial in terms of mass flow rate, it is desirable to measure the mass flow rate of the constituent without reference to the composition or flow rate of the total exhaust flow.

The usual method of measuring the mass flow rate of a constituent is by measuring the total gas flow rate or by raising the total gas flow rate to a fixed value by adding air, collecting a sample of the gas, and later measuring the concentration of the constituent in the sample whereupon the mass flow rate of the constituent can be calculated. That method fails to provide real time data due to the delay in collecting a sample and analyzing it, and often requires the concentration measurement of a highly diluted sample.

It is therefore a general object of the invention to provide a method of measuring the mass flow rate of a constituent of a gaseous stream independently of the composition or flow rate of the total gaseous stream.

It is a further object of the invention to provide a method of measuring, in real time, the mass flow rate of a constituent of a gaseous stream.

It is another object of the invention to measure the mass flow rate of a constituent of a gaseous stream by using a tracer gas added to the gaseous stream as a reference.

The method of the invention is carried out by measuring the concentration or mole fraction of a constituent of a gaseous stream, injecting into the gaseous stream a tracer gas at a known mass flow rate, measuring the concentration or mole fraction of the tracer gas, and then calculating the mass flow rate of the constituent from the known mass flow rate of the tracer gas, the relative molecular weights of the constituents and the tracer gas, and the concentrations of the constituent and the tracer gas.

The above and other advantages of the invention will become more apparent from the following description taken in conjunction with the accompanying drawing which diagrammatically illustrates an apparatus for carrying out the method of the invention.

The drawing shows a duct 10 through which exhaust gases from an internal combustion engine flow from left to right as indicated by the arrows. A probe 12 in the duct collects a sample of the exhaust gases which is analyzed by a concentration analyzer 14 which provides an electrical output as a function of the mole fraction of the gas being analyzed on line 16. A tracer gas injection device includes a rosette 18 within the duct connected to a metered supply of tracer gas 20 for providing tracer gas at a fixed known rate. The rosette comprises an annular tube with orifices which distribute the tracer gas into the gaseous stream flowing through the duct. A mixing section in the duct includes a pair of baffles comprising a disc 22 centrally located within the ducts by webs 24 and an annular baffle 26 downstream from the disc 22. The two baffles create turbulence in the gaseous stream to thoroughly mix the tracer gas with the exhaust gas. A second sample probe 28 downstream of the mixing section is connected to a concentration analyzer 30 which determines the mole fraction of at least the tracer gas and produces a corresponding electrical signal on line 32.

With the concentration of the constituent and the tracer gas being thus measured, the mass flow rate of the constituent is determined by the following relationship: $\dot{W}_c = [C_c(1-C_t) M_c \dot{W}_t]/(1-C_c) C_t M_t$, where $\dot{W}_c$ and $\dot{W}_t$ are the mass flow rates of the constituent and the tracer gas, respectively, $M_c$ and $M_t$ are the molecular weights of the constituents and the tracer gas respectively, and $C_c$ and $C_t$ are the measured concentrations of the constituents and the tracer gas respectively.

Where $C_t$ and $C_c$ are very small compared to unity, as is the usual case, the relationship may be expressed as: $W_c = C_c M_c \dot{W}_t / C_t M_t$.

In analyzing the exhaust gases from the internal combustion engine, it is usually desired to detect the mass flow rates of hydrocarbons, carbon monoxide, and oxides of nitrogen. The appropriate analyzers for each of these products are flame ionization detectors, non-dispersive infrared detectors, and chemiluminescence detectors respectively. In the event a given detector does not provide a linear output, it is necessary then to add a linearizing circuit at the output of the detector to provide an electrical signal proportional to the concentration of the constituents being analyzed.

As a specific example, where it is desired to monitor the hydrocarbons in the gaseous stream, the concentration analyzer 14 is a flame ionization detector which produces an electrical output proportional to the mole fraction or concentration of hydrocarbons in the gas stream. Propane is used as the tracer gas. The concentration analyzer 30 is then also a flame ionization detector which measures the combined concentration of the initial hydrocarbon constituent and the propane. The analyzer outputs 16 and 32 are then operated upon by a computing circuit to determine the mass flow rate of the hydrocarbon constituent. In this circuit, the constituent concentration signal $C_c$ on line 16 is subtractively combined with the combined hydrocarbon signal $c_c + C_t$ on line 32 at a summing junction 33. The output of the summing junction on line 34 then represents the tracer gas concentration $C_t$. The lines 16 and 34 then provide inputs to an electronic divider 36 which produces an output on line 38 proportional to $C_c$ divided by $C_t$. That signal is amplified by an amplifier 40 which has a gain proportional to $M_c \dot{W}_t/M_t$. The amplifier output on line 42 then is equal to $\dot{W}_c$ which is the mass flow rate of the initial hydrocarbon constituent. A readout instrument 43 which may be a recorder or meter provides the mass flow rate output information. Where it is required to determine the total mass of the constituents over a given time period, the signal on line 42 is integrated by an integrator 44 to produce a mass output $W_c$. It has been found as a practical matter to be advantageous to convert the mass flow rate signal $\dot{W}_c$ on line 42 to digital form in terms of a frequency proportional to $\dot{W}_c$. The integration is then performed by counting the digital pulses by an electronic counter over the desired time period.

Of course, the equation for determining mass flow rate may be expressed in many different mathematical forms which lend themselves to solution by an electronic circuit. The calculating circuit may be analog, digital or a combination of the two. Where the tracer gas is such that its concentration may be measured independently of the constituent the subtractive step is not necessary and the tracer gas analyzer is used directly by the computer circuit. Where it is desired to simultaneously monitor several constituents of the gaseous stream, several concentration analyzers 14 are utilized, each being appropriate to the specific constituents being monitored. A separate electronic computing channel is used in conjunction with each analyzer. However, no redundancy in the apparatus is required since the single tracer gas concentration measurement is sufficient for each computation and the signal $C_t$ on line 34 is supplied to each of the channels for use in the necessary computation.

It will thus be seen that the method of this invention provides a way to accurately determine the mass flow rate of a constituent of a gaseous stream in real time, there being no significant delay between changes of mass flow rate and the readout. Further, it will be recognized that the method requires no data on the bulk flow rate or the composition of the gaseous stream.

The embodiment of the invention described herein is for purposes of illustration and the scope of the invention is intended to be limited only by the following claims.

It is claimed:

1. A method of measuring the mass flow rate of a constituent of a gaseous flow, the constituent having a known molecular weight, comprising the steps of:

injecting into the gaseous flow a tracer gas at a known mass flow rate and having a known molecular weight, measuring the combined concentrations of the tracer gas and the constituent in the gaseous flow, measuring the concentration of the constituent upstream of the tracer gas, determining the concentration of the tracer gas by subtracting the measured concentration of the constituent from the measured combined concentrations, and computing by electrical means the mass flow rate of the constituent according to the relationship $\dot{W}_c = C_c M_c \dot{W}_t / C_t M_t$ where $\dot{W}_c$ and $\dot{W}_t$ are the mass flow rates of the constituent and the tracer gas respectively, $C_c$ and $C_t$ are the concentrations of the constituent and the tracer gas respectively, and $M_c$ and $M_t$ are the molecular weights of the constituent and the tracer gas respectively.

* * * * *